Figure 1:
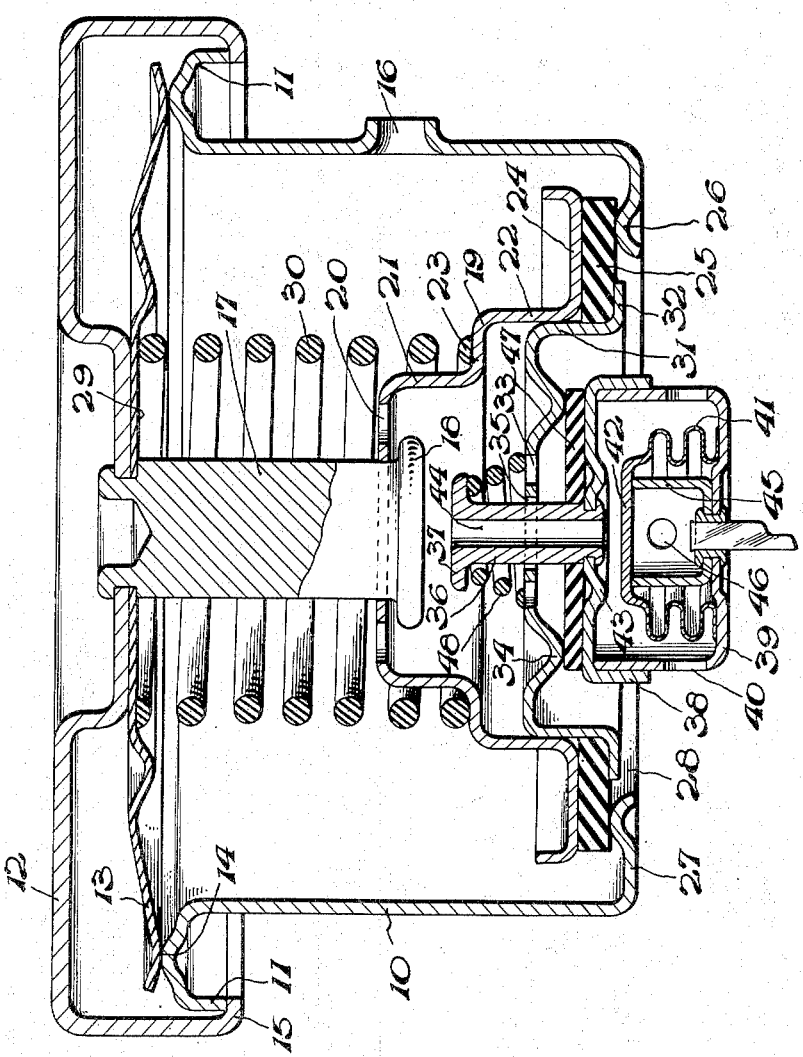

Dec. 26, 1950

W. M. WATKINS, JR
THERMOSTATICALLY CONTROLLED
PRESSURE CAP FOR RADIATORS 2,535,974

Filed July 2, 1947

2 Sheets-Sheet 1

Inventor
William M. Watkins, Jr.

By Cameron, Kerkam + Sutton
Attorneys

Patented Dec. 26, 1950

2,535,974

UNITED STATES PATENT OFFICE 2,535,974

THERMOSTATICALLY CONTROLLED PRESSURE CAP FOR RADIATORS

William M. Watkins, Jr., Knoxville, Tenn., assignor to Robertshaw-Fulton Controls Company, a corporation of Delaware Application July 2, 1947, Serial No. 758,679

5 Claims. (Cl. 236—92)

This invention relates to pressure caps for radiators of vehicle cooling systems, and more particularly to a cap of this character which is thermostatically controlled.

The desirability has long been recognized of providing the cap for a vehicle-cooling-system radiator with a valve which is closed while the system is in operation, not only to prevent escape of vapor through the vent conventionally provided, but also to cause the system to operate at a pressure somewhat above atmospheric because of the increased efficiency thereby obtained, such a valve being spring controlled to open at a predetermined superatmospheric pressure and thereby prevent undue pressure developing in the system. While many forms of pressure caps have heretofore been proposed to this end, they have not proved entirely satisfactory in operation, particularly when applied to cooling systems which include thermostatically controlled valves for predetermining the coolant flow, because such thermostatically controlled valves are designed to operate at atmospheric pressure, and application of the superatmospheric pressure to the system has upset the designed operation of such a valve at the predetermined temperature at which it is supposed to function. To overcome this difficulty it has also been proposed to incorporate a thermostatically controlled valve in the cap which includes a pressure responsive valve as above referred to, so that the imposition of the superatmospheric pressure will not occur until the thermostatically controlled valve is in such a position, for example wide open, that the higher pressure does not interfere with its desired functioning. But controls of the latter character have not proved entirely satisfactory because they have been of such a construction that, while the pressure is not imposed on the system until a predetermined temperature has been reached, thereafter any increase in the temperature within the system reacts on the valve through which pressure is imposed on the system so as to alter the pressure at which said valve is designed to function.

It is an object of this invention to provide a thermostatically controlled pressure cap which is so constructed that changes in temperature in the coolant do not react on the pressure controlled valve to modify its operation.

Another object of this invention is to provide a device of the type characterized which is so constructed that the action of the thermostatically controlled valve is independent of the action of the pressure controlled valve and vice versa, so that changes of temperature within the system do not modify the pressure at which the pressure responsive valve is designed to act or vice versa.

Another object of this invention is to provide a device of the type characterized wherein are provided valves for controlling the temperature at which the pressure controlling valve becomes effective, for relieving pressure when a predetermined superatmospheric pressure has been reached, and for relieving the pressure when a predetermined lower pressure has been reached.

Another object of this invention is to provide a device of the type last characterized wherein the thermostatically controlled valve and the valve for relieving pressure when a predetermined lower pressure has been reached may be combined so that the two referred to functions are performed by a single valve.

Another object of this invention is to provide a device of the type characterized which is simple in construction, composed of parts that are easy to fabricate and assemble, and efficient in operation.

Other objects will appear as the description of the invention proceeds.

The invention is capable of receiving a variety of mechanical expressions two of which, by way of illustration, are shown in the accompanying drawings, but it is to be expressly understood that the drawings are for purposes of illustration only and are not to be construed as a definition of the limits of the invention, reference being had to the appended claims for that purpose.

Figure 2:
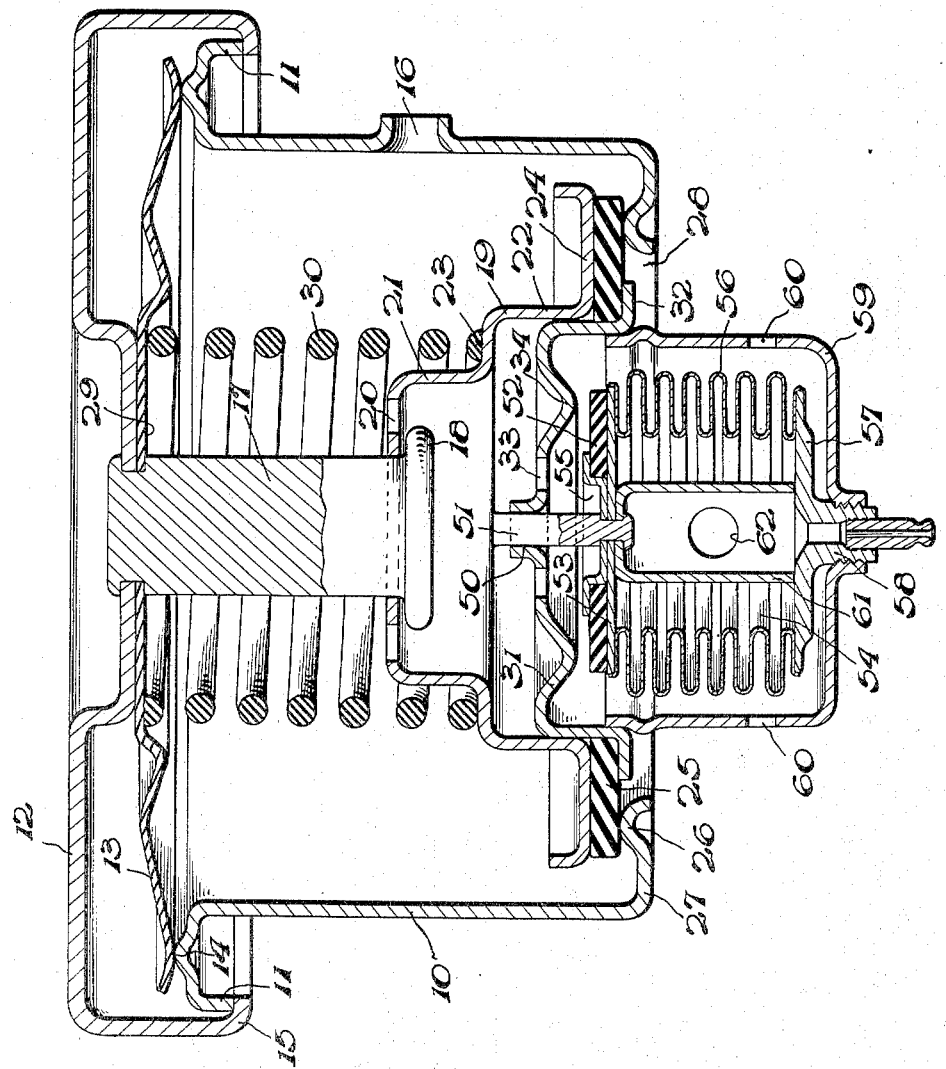

Referring in detail to the accompanying drawings, wherein the same reference characters are employed in both figures to designate corresponding parts, Fig. 1 is an enlarged axial section, somewhat diagrammatic in character, of one embodiment of the present invention; and Fig. 2 is a corresponding section of another embodiment of the present invention.

Referring first to the form shown in Fig. 1, 10 designates a filler neck of any suitable size, construction and material, such as commonly provided for vehicle radiators, said neck being shown as having outwardly directed ears 11 adapted to receive a cap 12, which may be of any suitable size, construction, and material, provided as customary with a Belleville spring 13 which is designed to contact an upper surface 14 on the filler neck and, by reaction therewith, draw the inturned flange 15 on the cap into sealing contact with the lugs 11. Filler neck 10 is provided in any suitable way with a vent 16 leading to the atmosphere.

Depending from the cap 12 is a post 17, which may be used for attaching the Belleville spring 13 to the cap as shown, from which are carried the several elements of the combined thermostatically and pressure operated valve mechanism to be described, so that all of said parts constitute a unit for application to and removal from the filler neck with the cap. Said post 17 is illustrated as having a head or flange 18, and slidably mounted on said post 17 is a cup-shaped valve member 19 provided at any suitable location, as in its bottom wall, with one or more venting apertures 20. As shown, the lateral wall of valve member 19 has portions 21 and 22 of different diameters so as to provide an intermediate shoulder 23 which functions as a spring seat. Portion 22 of said valve member terminates in an outwardly extending flange 24 which carries, attached thereto in any suitable way, a seating member 25 of any suitable material such as rubber or the like. Seating member 25 is designed to cooperate with a suitable valve seat 26, here shown as provided on the filler neck and formed by reversely curving the inner periphery of the flange 27 which surrounds the central venting opening 28 at the inner end of the filler neck. Interposed between the shoulder 23 and the surface 29 at the under face of the cap 12 is a coil spring 30 of such strength as to provide for opening of the valve member 19 with respect to its seat 26, and thereby release the pressure in the radiator, when a predetermined superatmosphere pressure has been reached. When the cap 12 is removed from the filler neck, valve member 19 is suspended on the post 17, with its bottom wall engaged with the head 18, but when the cap is applied to the filler neck the seating member 25 engages the valve seat 26 and lifts the bottom wall of the valve member 19 slightly off of the head 18 against the force of spring 30.

Suitably attached to the valve member 19, as by a press fit, is a second cup-shaped member 31 which may have its open end flanged outwardly as shown at 32 to serve in retaining the seating member 25 on the valve member 19. Member 31 is also provided at any suitable location with one or more venting apertures 33, and its bottom wall is suitably shaped, as by the bead 34, so as to provide a second valve seat around said apertures 33. Slidably mounted in a central aperture 35 in the bottom of member 31 is a second post 36 provided with a head or flange 37. To the opposite end of said post 36 is suitably attached, as by staking, a third cup-shaped member 38 to which is suitably attached, as by a pressed fit, a fourth cup-shaped member 39 provided with one or more apertures 40. Suitably attached to the member 39 is a thermostat of any suitable form and construction, here shown as comprising an expansible and collapsible corrugated tubular wall 41 having its movable end wall 42 designed to function as a valve member by engagement with a valve seat of any suitable construction, here shown as in the form of a bead 43 provided in the bottom wall of member 38. Post 36 is provided with a passage 44 therethrough opening within the seat 43 and which is therefore closed when valve member 42 engages its seat 43. As shown, the thermostat 41 is provided with an interior tubular stop 45, apertured at 46 to provide for the internal circulation of the thermosensitive fluid with which thermostat 41 is charged, said stop 45 functioning to limit the extent to which the valve member 42 may be withdrawn from its valve seat 43 when functioning as hereinafter explained.

Member 38 functions as a valve member and is provided with a seating member 47 of any suitable material, such as rubber or the like, for engagement with the valve seat 34, and interposed between the upper wall of the cup-shaped member 31 and the head 37 of post 36 is a coil spring 48 which normally acts to hold the seating member 47 in contact with the valve seat 34 with the cup-shaped members 38 and 39 and their enclosed thermostatically controlled valve mechanism suspended from the post 36. However, when a subatmospheric pressure is applied to the underside of the member 38 through the apertures 40 in member 39, seating member 47 can be withdrawn from seat 34 against the force of the spring 48.

When the parts are installed as shown in Fig. 1 seating member 25 on valve member 19 is held by spring 30 in contact with its seat 26 and seating member 47 is held by spring 48 in contact with its seat 34. However, the interior of the radiator is vented to atmosphere through the apertures 40, past the open valve member 42, through the passage 44 in post 36, through the apertures 20, and thence to the vent 16. The thermostat 41 is so constructed or charged that when a predetermined temperature is reached, selected so that the imposition of an additional pressure on the coolant in the cooling system will not interfere with the designed operation of any thermostatically operated valve for controlling the circulation of engine coolant therein, the thermostat actuates the valve member 42 to seat it against its seat 43. This closes the passage 44, and therefore the interior of the radiator is no longer vented to the atmosphere. Consequently the pressure in the radiator can build up to a predetermined superatmospheric pressure, say on the order of five pounds per square inch. If the pressure tends to build up beyond said predetermined pressure it acts on the under face of the valve member 25, which is subjected to the pressure in the radiator, to open valve member 19 against the force of spring 30, the force of said spring predetermining the pressure in the radiator at which said valve member 19 is opened. Opening of said valve member 19 vents the radiator to atmosphere through the valve controlled opening 28 and the vent 16. If the pressure within the radiator for any reason drops to a subatmospheric pressure, so that the seating member 47, instead of being held against its seat 34 by the superatmospheric pressure in the radiator as well as the force of spring 48, is subjected on its under face to a subatmospheric pressure, and when the differential in pressure between the atmospheric pressure acting on the upper face of said valve member 47 and the subatmospheric pressure acting on its under face is sufficient to overcome the force of the spring 48, valve member 47 moves away from its seat 34, venting the interior of the radiator to atmosphere through the apertures 33 and 20 and the vent 16. If the temperature in the cooling system drops below the aforesaid predetermined temperature so that it is desirable that the cooling system be permitted to function at atmospheric pressure, thermostat 41 withdraws valve member 42 from seat 43, venting the interior of the radiator to atmosphere through the apertures 40, the passage 44, the apertures 20 and the vent 16.

It will therefore be perceived that the superatmospheric pressure can not be applied to the cooling system until the temperature therein has attained a predetermined degree, after which the thermostatically operated valve closes to permit the pressure controlling valve mechanism to function whereby a superatmospheric pressure is imposed on said system, but the magnitude of this pressure imposed on the system is kept closely within predetermined limits, because if the pressure exceeds or falls below the predetermined pressures determined by the forces of the springs 30 and 48, the radiator is at once vented to the atmosphere. Moreover, the pressure and temperature responsive mechanism are so constructed and associated that neither interacts on the other, so that if the temperature in the cooling system continues to rise after the thermostatically operated valve is closed no additional force is imposed on the spring 30 to alter the pressure at which the valve member 19 will open to relieve the pressure in the radiator.

In the embodiment so far described separate valves have been provided for thermostatic actuation and for predetermining the minimum pressure to be imposed on the cooling system. If preferred, however, the thermostatically operated valve and the vacuum relief valve may be combined as shown in Fig. 2.

In the form shown in Fig. 2, the filler neck 10, cap 12, valve member 19 suspended from a post 17 and controlled by a spring 30 for actuating the seating member 25 which cooperates with the valve seat 26, and the cup-shaped member 31 attached to said valve member 19, may be and are shown as of the same construction and arrangement as in the embodiment of Fig. 1, like parts being given the same reference characters. In this embodiment, however, said cup-shaped member 31 has a central aperture 50 in which is slidably received a post 51. The opposite end of post 51 is suitably attached, as by staking, to a valve member, here shown as in the form of a seating member 52 of any suitable material, such as rubber or the like, carried in any suitable way by the movable end wall 53 of a thermostat 54, a clamping member 55 being shown as staked to end wall 53 by the post 51. While a thermostat of any suitable character and construction may be employed, the form illustrated includes an expansible and collapsible corrugated tubular wall 56 suitably attached at one end, as by brazing, to movable end wall 53 and having its opposite end suitably attached, as by brazing, to a stationary end wall 57, here shown as formed integrally with a threaded post 58 received in a threaded aperture in a cup-shaped housing 59 whose open end is suitably attached, as by a pressed fit, in the cup-shaped member 31. Cup-shaped member 59 is provided with one or more apertures 60, so that pressure in the radiator has access to the interior of said cup-shaped member 59. The thermostat is provided with an interior tubular stop 61, apertured at 62 to provide for circulation of the thermosensitive fluid with which said thermostat is charged, and shown as carried by the movable end wall 53, said stop being adapted to abut the stationary end wall 57 and predetermine the extent to which the valve member 52 may be withdrawn from seat 34.

When the parts are assembled as shown, the interior of the radiator is vented through apertures 60, the apertures 33 and 20, and the vent 16.

When a predetermined temperature is reached the thermostat 54 expands to engage valve member 52 with seat 34, preventing further escape of vapor. When the pressure at the interior of the radiator exceeds the predetermined pressure it acts on valve member 25 against the force of the spring 30 to open said valve member and vent the radiator to atmosphere through the aperture 28 and vent 16 as explained in conjunction with the embodiment of Fig. 1. The effective area of the valve seat 34 in this embodiment is greater than the effective area of the expansible and collapsible wall 56, and therefore the pressure in the system acting on the underside of the valve member 52 through apertures 60 operates, in conjunction with the thermostat 54, to hold the valve member 52 in contact with its seat until the pressure in the radiator drops to a subatmospheric pressure, whereupon the differential pressure acting on the valve member 52, because its upper face is exposed to atmospheric pressure, becomes sufficient at a predetermined subatmospheric pressure to overcome the pressure with which the thermostat is functioning to hold the valve member 52 on its seat 34, and valve member 52 is then withdrawn from its seat, venting the radiator to atmosphere through the apertures 60, 33 and 20 to vent 16. Similarly, if the temperature in the system drops to a point wherein it is desirable to restore atmospheric pressure because of the thermostatically operated valve which controls circulation of engine coolant, the thermostat 54 contracts to remove valve member 52 from its seat and the radiator is vented to atmosphere through the aforesaid apertures 60, 33 and 20 to vent 16. Therefore, except for using a single valve for responding to temperature and relieving a vacuum the embodiment of Fig. 2 operates in the same way as the embodiment of Fig. 1 and possesses the same advantages as pointed out in connection therewith.

While the embodiments of the invention illustrated on the drawings have been described with considerable particularity, it is to be expressly understood that the invention is not restricted thereto as the same is capable of receiving a variety of expressions as will now be apparent to those skilled in the art. While for purposes of illustration the thermostat of these embodiments has taken the form of an expansible and collapsible vessel charged with a thermosensitive fluid, it is to be expressly understood that any other suitable form of thermostat, as bimetallic, using differential expansion of metals, etc., may be employed. The apertures, passages, etc., providing the vents may be otherwise constructed and located, other forms of valve members may be used, changes may be made in the details of construction, arrangement and proportion of parts, etc., without departing from the spirit of this invention. Reference is therefore to be had to the appended claims for a definition of said invention.

What is claimed is:

1. In a thermostatically controlled pressure cap for radiators, in combination with a filler neck having venting means and a cap for closing the end of said filler neck, combined thermostatically and pressure operated valve mechanism for controlling the venting of the radiator through said neck including a valve member carried by said cap for subjection to the radiator pressure, means providing a venting port cooperating with said valve member, a spring cooperating with said valve member to predetermine the pressure at which said valve member will open, said valve member including means providing a second venting port, a second valve member cooperating with said second port, a thermostat operatively connected to said second valve member, said second valve member and thermostat being carried by said first valve member and predetermining the temperature at which said second port is opened and closed, said first valve member including means providing a third venting port, and a third valve member carried by said first valve member and cooperating with said third port.

2. In a thermostatically controlled pressure cap for radiators, in combination with a filler neck having venting means and a cap for closing the end of said filler neck, combined thermostatically and pressure operated valve mechanism for controlling the venting of the radiator through said neck including a valve member carried by said cap for subjection to the radiator pressure, means providing a venting port cooperating with said valve member, a spring cooperating with said valve member to predetermine the pressure at which said valve member will open, said valve member including means providing a second venting port, a second valve member cooperating with said second port and a thermostat operatively connected to said second valve member, said second valve member and thermostat being carried by said first valve member and predetermining the temperature at which said second port is opened and closed, and valve mechanism carried by said first named valve member and responsive to a predetermined drop in radiator pressure for also venting said radiator.

3. In a thermostatically controlled pressure cap for radiators, in combination with a filler neck having venting means and a cap for closing the end of said filler neck, combined thermostatically and pressure operated valve mechanism for controlling the venting of the radiator through said neck including pressure-responsive spring-controlled valve mechanism for venting the radiator in response to a predetermined increase in pressure in said radiator, separate thermostatically controlled valve mechanism entirely carried by said first named valve mechanism but operable independently thereof for venting the radiator when the temperature therein is below a predetermined temperature, and a third valve mechanism carried by said pressure-responsive valve mechanism and responsive to a predetermined decrease in pressure in said radiator for also venting the same.

4. In a thermostatically controlled pressure cap for radiators, in combination with a filler neck having venting means and a cap for closing the end of said filler neck, combined thermostatically and pressure operated valve mechanism for controlling the venting of the radiator through said neck including a post depending from said cap, a valve member slidable on said post and adapted to be subjected to the radiator pressure, means providing a venting port cooperating with said valve member, a spring cooperating with said valve member to predetermine the pressure at which said valve member will open, said valve member including means providing a second venting port, a second valve member carried by said first valve member and cooperating with said second port, a thermostat carried by said first valve member and operatively connected to said second valve member to predetermine the temperature at which said second port is opened and closed, and valve mechanism carried by said first valve member and responsive to a predetermined drop in radiator pressure for also venting said radiator.

5. In a thermostatically controlled pressure cap for radiators, in combination with a filler neck having venting means and a valve seat surrounding a venting port, combined thermostatically and pressure operated valve mechanism for controlling the venting of the radiator through said neck including a pressure-responsive spring-controlled valve member for cooperation with said seat, a post carried by said cap and on which said valve member is slidably suspended for subjection to the pressure in the radiator, thermostatically controlled valve mechanism entirely suspended on said first named valve member for subjection to the temperature in the radiator, said last named valve mechanism including a valve member cooperating with a port provided in means on said first named valve member, and a thermostat reacting between said first and second named valve members to predetermine the temperature at which said port is opened and closed, said first named valve member also including a port and a spring-controlled pressure-responsive valve member cooperating with said last named port for venting the radiator upon a predetermined drop in the pressure therein.

WILLIAM M. WATKINS, Jr.,

REFERENCES CITED

The following references are of record in the file of this patent:

UNITED STATES PATENTS

| Number | Name | Date |
| --- | --- | --- |
| 2,333,993 | Frailing | Nov. 9, 1943 |
| 2,335,778 | Martin-Hurst | Nov. 30, 1943 |
| 2,415,475 | Eshbaugh | Feb. 11, 1947 |

FOREIGN PATENTS

| Number | Country | Date |
| --- | --- | --- |
| 519,563 | Great Britain | Apr. 1, 1940 |